No. 859,073. PATENTED JULY 2, 1907.
E. KEMPSHALL.
TIRE.
APPLICATION FILED MAY 31, 1906.

Witnesses
James A. Bennett
Walter W. Williams

Inventor
Eleazer Kempshall
By
Attorney

UNITED STATES PATENT OFFICE.

ELEAZER KEMPSHALL, OF BOSTON, MASSACHUSETTS.

TIRE.

No. 859,073.

Specification of Letters Patent.

Patented July 2, 1907.

Application filed May 31, 1906. Serial No. 319,555.

*To all whom it may concern:*

Be it known that I, ELEAZER KEMPSHALL, a citizen of the United States, residing at Boston, in the county of Suffolk and State of Massachusetts, have invented certain new and useful Improvements in Tires, of which the following is a specification.

This invention relates to improvements in tires.

In the organization of my improved tire I utilize a plurality of transversely arranged sections of gutta-percha, rubber and fabric, the object being to provide a resilient tire strengthened by the interposed sections of gutta-percha and fabric. The sections are incased in a resilient cover, and the whole is vulcanized to fuse the gutta-percha and rubber sections to the cover to provide a substantial structure.

Figure 1:
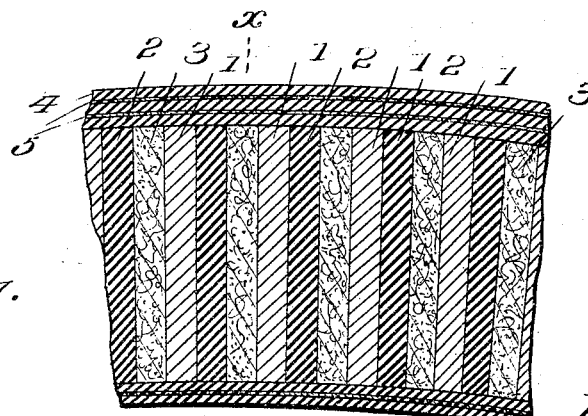
Figures 3, 4:
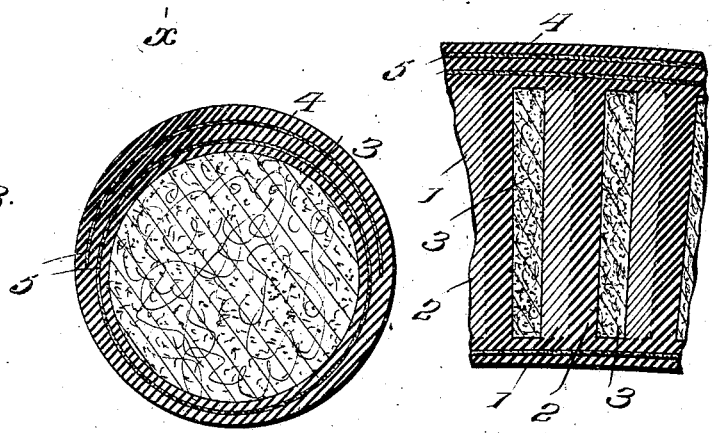
Figure 2:
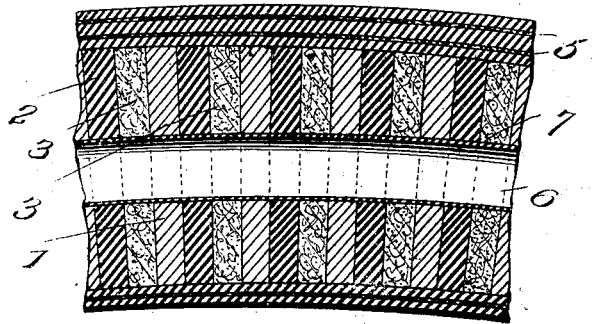

In the drawings—Figure 1 is a section of a portion of my improved tire. Fig. 2 is a vertical sectional view, but showing an interposed inflated tube. Fig. 3 is a transverse section on the line $x$—$x$, Fig. 1. Fig. 4 is a view similar to Fig. 1, after the tire has been vulcanized.

The numeral 1, indicates gutta-percha sections; 2, rubber sections; and 3, fabric sections of material. The sections are assembled in tire form side by side, and alternately disposed. A resilient cover 4, incases the sections, and it is preferably strengthened by interposed strips of fabric 5.

In Fig. 2, I have shown an interior inflated tube 6, fitting in openings 7, formed in each of the sections, as clearly shown.

When the sections are assembled, it is preferable to interpose a fabric section between gutta-percha and rubber sections, to assist in holding the latter together, while the gutta-percha sections are located between the fabric and rubber sections, to form a substantial brace between them when the tire is completed. After the sections are properly assembled in tire form, the cover 4, is applied in any well known manner, and the structure is subjected to a vulcanizing process.

When the tire is vulcanized, the resilient cover fuses with the rubber sections 2, and the gutta-percha sections 1, while the pores of both said sections open up sufficiently to allow the fibers on the sides of the fabric to become embedded therein, which results in said fabric sections becoming an integral part of the tire. The fabric sections being transversely embedded within the tire structure and forming a part of the latter obviously the two adjacent sections are tied together while a resilient action between them may take place. The gutta-percha sections while yielding to some extent in line with the circumference of the tire, yet they are of sufficient non-resilient character as to provide a substantial brace, to prevent the crushing or free compression of the tire as a whole.

Briefly stated the inflated tube enables me to thoroughly vulcanize the tire form where it is desired to have a central opening for tires designed for light loads.

The advantages and practical features of the invention it is thought will be readily understood by those skilled in the art to which it appertains.

What I claim is:

1. A tire composed of transverse sections of gutta-percha, rubber, and fabric sections of material, and a cover inclosing said sections of material, said cover being vulcanized to the gutta-percha and rubber sections.

2. A tire composed of transverse sections of resilient material, transverse sections of less resilient material, and transverse sections of non-resilient material, all said sections being placed side by side, and a cover for the sections, said cover being vulcanized to the resilient and less resilient sections of material around the entire outer edges of the latter.

3. A tire composed of alternately arranged transverse sections of resilient, less resilient, and non-resilient material, and a cover for the sections, said cover being vulcanized to the resilient and less resilient sections around the entire outer edges of the latter.

4. A tire composed of transversely arranged sections of resilient, less resilient, and non-resilient material formed with openings, an inflated tube in the openings, a cover for the sections, said cover being vulcanized to the resilient and less resilient sections.

5. A tire composed of transversely and alternately arranged sections of gutta-percha, rubber and fabric, the gutta-percha and rubber sections being vulcanized to unite all the sections together, and a cover for the sections.

In testimony whereof I have signed my name to this specification in the presence of two subscribing witnesses.

ELEAZER KEMPSHALL.

Witnesses:
JNO. IMIRIE,
C. L. MATTHEWS.